June 23, 1931.   G. VEBER   1,811,446
BEVEL WHEEL
Filed Sept. 26, 1927   4 Sheets-Sheet 1

Inventor
Georges Veber,
by H. B. Wilson &co
Attorneys

June 23, 1931.  G. VEBER  1,811,446
BEVEL WHEEL
Filed Sept. 26, 1927    4 Sheets-Sheet 3

Inventor
Georges Veber,
by H. R. Willson & Co
Attorneys

June 23, 1931.  G. VEBER  1,811,446
BEVEL WHEEL
Filed Sept. 26, 1927  4 Sheets-Sheet 4

Inventor
Georges Veber,
by H. B. Willson & Co
Attorneys

Patented June 23, 1931

1,811,446

UNITED STATES PATENT OFFICE

GEORGES VEBER, OF EPINAL, FRANCE, ASSIGNOR TO ROGER GABRIEL LOUIS COUTANT, OF VINCENNES, SEINE, FRANCE

BEVEL WHEEL

Application filed September 26, 1927, Serial No. 222,060, and in France November 5, 1926.

The invention has for object bevel wheels, the teeth of which are such that they can be cut by means of a milling cutter having a uniform profile, the gearing contact remaining however correct.

According to the invention, the profiles of the tooth to be cut, at the various points of its length, are constituted by arcs sensibly superposable of one and the same involute; the angle of pressure, of one of the ends to the other of the teeth, varying accordingly.

The edges of the teeth are not convergent, but the gearing contact remains correct, if the same variation of the angle of pressure exists in the two associated wheels. A bevel wheel can, in fact, be considered as formed by the assemblage of an infinity of bevel or conical discs, of decreasing diameters, fitted in each other, and toothed on their edges. It suffices that the teeth of each of these elementary discs can gear with those of the corresponding disc on the associated wheel, in order that the engagement of the wheels should be satisfactory.

The accompanying drawings illustrate by way of example, one of the forms of construction of the bevel wheel.

In an ordinary bevel wheel, in which the flanks or sides of the teeth converge (Fig. 1), all the sections made transversely to the teeth give similar sections, the dimensions of which go on decreasing. The two curved edges of these sections are always two arcs of involute. The radius of the developed circle which has generated them varies proportionally to the radius of the pitch circle of the teeth at the section under consideration, and the pressure angle (14° 30') remains the same all along the tooth.

Figure 1:
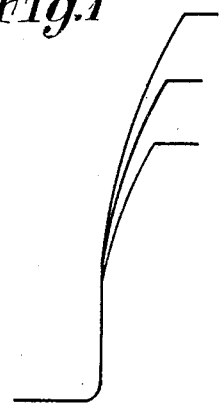
Fig. 1 shows how varies the profile along a tooth cut in the ordinary manner.

It will be understood that such a flank, formed by a succession of similar curves, but of different dimensions, cannot be cut by a single milling cutter. Fig. 1, which represents three sections made in a tooth with a constant pressure angle, shows the impossibility of effecting such a cutting.

According to the present invention, the pressure angle does not remain constant, but varies in a continuous manner along the tooth. The profiles of the successive sections are no longer similar to each other, but approximately superposable. Such a form of teeth preserves a proper gearing engagement whilst greatly simplifying the cutting.

Figure 2:
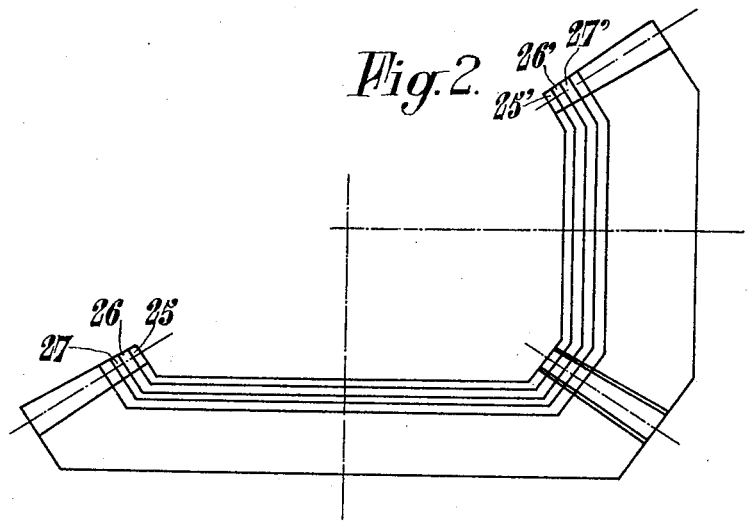
Fig. 2 is an axial diagrammatic section of a pair of bevel wheels.

The gearing engagement of the teeth thus obtained is theoretically perfect. In fact, a conical gearing can be considered as formed by the assemblage of an infinity of conical discs of decreasing diameters, fitted into each other and toothed on their edge (Fig. 2). It suffices that the teeth of each elementary disc 25, 26, 27 should be capable of gearing with those of the corresponding disc of the associated wheel 25', 26', 27' in order that the gearing engagement of the wheels should be satisfactory. This result is obtained if the progressive variation of the pressure angle is the same for the two wheels in contact.

The great simplification of the cutting arises from the fact that teeth having a variable pressure angle can be cut by means of a milling cutter having a uniform profile.

Figure 3:
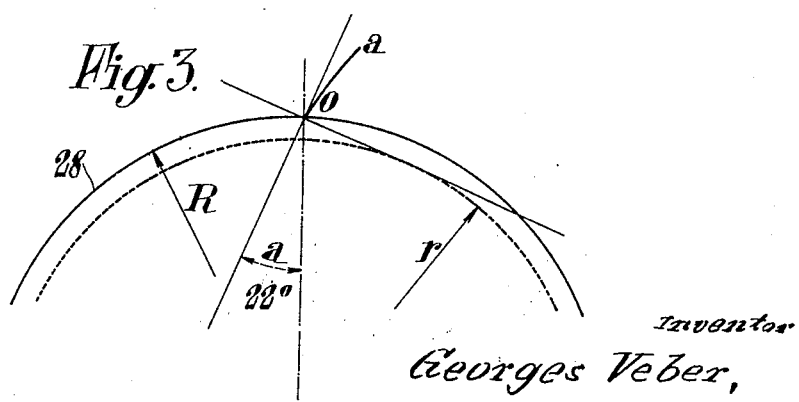
Figs. 3, 4 and 5 are plans showing how are traced the teeth of the wheels in accordance with the invention.
Figure 4:
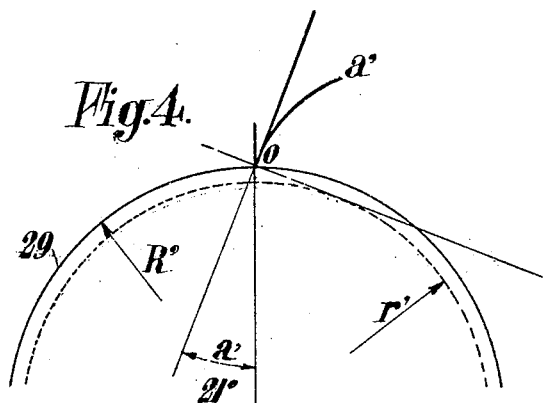
Figure 5:
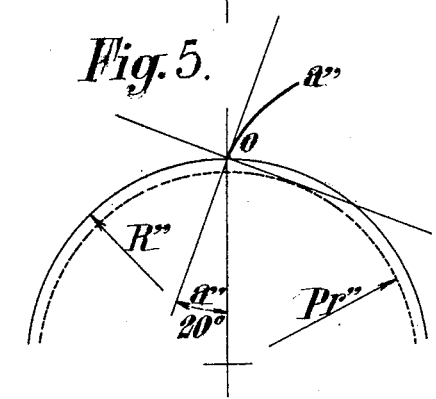
Figure 6:
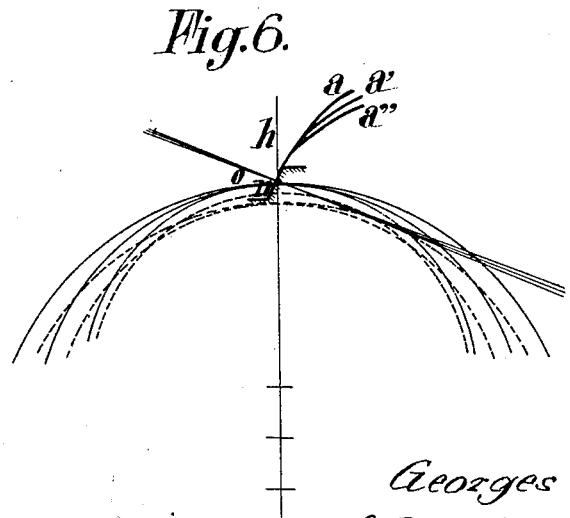
Fig. 6 shows that the profile of the said teeth remains practically identical throughout their length.

In fact, supposing we have (Figs. 3, 4, 5) three sections made in a bevel gear tooth, at both ends and in the middle. The radii R, R', R'' of the pitch circles 28, 29, 30 diminish in the same proportion as the radii of the top and bottom circles of the teeth. If different values are given to the pressure angles; $a-a'-a''$, the radii of the circles to be developed $r, r', r''$ will no longer be in one and the same ratio R, R', R''; the involutes $d, d', d''$ obtained with the circles of radius $r, r', r''$ will no longer be similar. If these three involutes are superposed (Fig. 6) by causing to coincide the origins of the three involutes (points where they leave the foot or base circle of the teeth), it will be seen that for pressure angles $a, a', a''$ suitably graduated (here: 22°—21°—20°), a nearly absolute coincidence is obtained, of the order of a hundredth of a millimeter, on a length equal or superior to the height of the tooth.

The first involute $a$ corresponds to the large diametral pitch of the tooth; it mingles with the second involute $a'$ (corresponding to the mean diametral pitch) on a length $h-n$, height of the tooth at this place, and with the third involute $a''$ (corresponding to the small diametral pitch) throughout the height of the tooth at the small diametral pitch.

The involute $a$ may therefore be considered as giving the very exact profile of the tooth throughout its length, by admitting that the pressure angle has constantly varied.

In practice, this angle varies from 18° to 25°, according to the relative length of the tooth. As the associated wheel is cut by the same method, at each point of contact of the wheels, are two involutes traced with the same pressure angle and the running is perfect.

Figure 8:
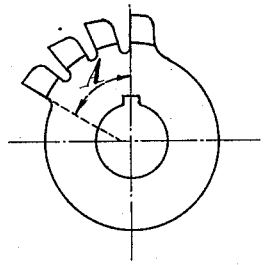
Fig. 8 is a front view of the milling cutter.
Figure 9:
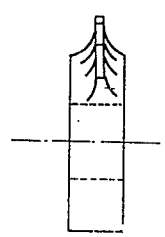
Fig. 9 is a side view of the same.

For cutting a bevel wheel according to the invention, use can be made of a milling cutter toothed only on an angle A (Figs. 8 and 9) and having its teeth arranged on a helix shaft having a pitch $p$.

Figure 7:
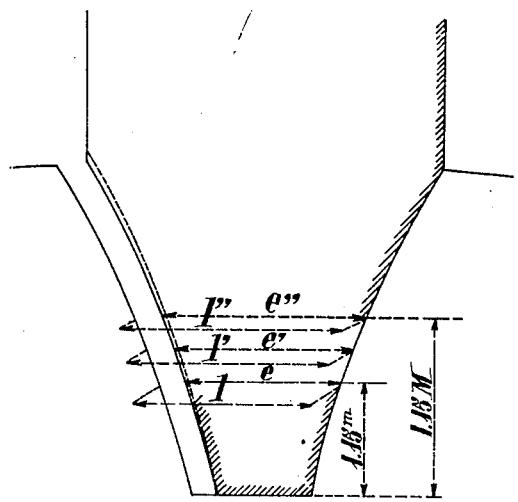
Fig. 7 is a section, through an axial plane, of the milling cutter.

The flanks of the milling cutter have for profile an involute (Fig. 7), traced with a pressure angle of 22° in the above example.

The blank to be cut continuously rotates with a speed V; the milling cutter rotates at the speed V such that: $V = n \times v$, $n$ being the number of teeth of the wheel to be cut.

The teeth of the milling cutter enter more and more into the blank in proportion as the feed proceeds. The thickness of a tooth of the milling cutter (Fig. 7) at the level of the pitch circles, at the small, mean and large diametral pitches is respectively, $e-e'-e''$. The teeth of the milling cutter cut hollows having a length $l-l'-l''$, on these various pitch circles.

These widths are equal to those of the teeth at the level of the pitch circle under consideration, to which is added the circular displacement of the gear during the passage of the teeth of the milling cutter and subtracted the displacement of these teeth during the same time, owing to their arrangement on an arc of a helix.

One has therefore, for the extreme sections of the set of teeth, the two following equations:

$$e + v. A' - p. A' = 1 \quad (1)$$
$$e'' + v'' A' - p. A' = 1'' \quad (2)$$

in which: $e-e''$ are the widths of the teeth of the milling cutter at the level of the two pitch circles under consideration. $v, A', v'', A'$ are the circular displacements of the gear during the cutting of a tooth, these displacements are equal to the pitch circumference multiplied by A and divided by 360. $p. A'$ represents the side displacement of the teeth of the milling cutter during cutting; it is equal to $p$, the pitch of the milling cutter, multiplied by A and divided by 360. 1 and $1''$ are the widths which must have the teeth formed on the two pitch circles under consideration.

By solving these two equations, one finds $p$ the pitch of the cutter and A the toothed angle of the cutter.

At the middle of the length of the tooth, the width $e'$ of the cutter at the level of the corresponding pitch circle, the circular displacement $v', A'$ of the blank during cutting, the pitch $p$ of the cutter, its toothed angle and the width of the hollow formed at this point, are connected by the equation:

$$e' + v'. A' - p. A' = 1' \quad (\text{Fig. 3})$$

If one inserts in this equation the values of $p$ and of A taken from the Equations 1 and 2, these values verify the Equation 3 with a very great approximation, more than sufficient in the practice.

For instance, for a cutter cutting a wheel having 42 teeth, with a maximum diametral pitch of 3, at the diametral pitches 3 and 2, 5 and 2, the following values are obtained for $e$: 3,10 millimeters, 3,63 millimeters, 4.14 millimeters, this with the relative displacements, corresponds to cutting widths of 3,14 millimeters, 3,92 millimeters, 3,71 millimeters. The angle A is of 60°, the pitch $p$ of 6 millimeters.

The widths $e$ are moreover to be rectified, as, during cutting, the cutter, the axis of which remains in fact fixed, seems to rock from right to left relatively to the teeth which effect a rotation. This effect is corrected by causing the profile of the milling cutter to pivot about the suitable point, according to an angle equal to $$\frac{360}{2n},$$

$n$ being the number of teeth of the wheel to be cut. This pivoting renders the profile thinner in the upper part and widens it at the base.

Figure 10:
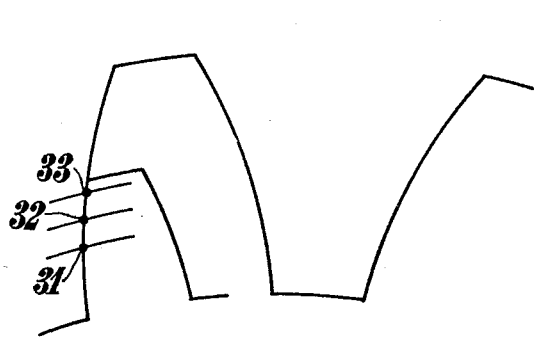
Fig. 10 shows the intersection points of the pitch line with the outline of the cutter.

Fig. 10 shows, at 31, 32, 33, the intersection points of the pitch line with the outline of the milling cutter, for the little average and large diametral pitch, respectively.

For obtaining rigorously accurate toothed wheel it is necessary to have the three points 31, 32, 33 on a same straight line, whereas, they are, at the contrary, situated on an evolvent arc.

Figure 11:
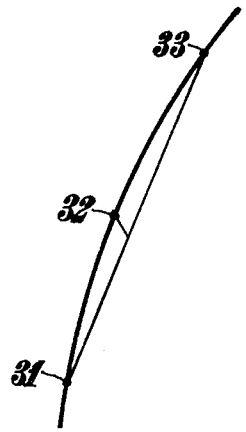
Fig. 11 shows the desirable profile.

According to the invention, the accurate cutting is obtained by displacing the milling cutter and the wheel to be cut, one relatively to the other, during the cutting operation, not only in a single direction, but also according to two directions at right angles, so that the points 31, 32, 33, are on the same straight line (Fig. 11).

Figure 12:
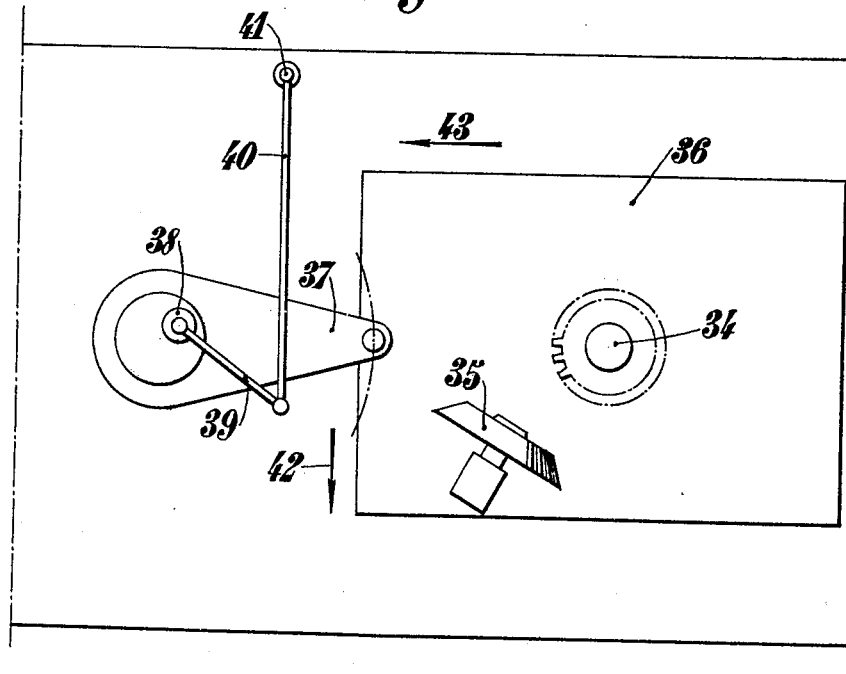
Fig. 12 is a diagrammatic plan view of a machine.

Use can be made, e. g. of the device shown at the Fig. 12 in which the milling cutter is shown at 34, the wheel to be cut at 35, 36 being the frame. The latter is connected, by means of an arm 37, to an eccentric 38 on which oscillates the said arm, the initial position of the eccentric being adjustable at will. The eccentric 38 is connected by means of the crank lever 39 and the rod 40 to a fixed point 41. It can be seen that, during the displacement of the frame, in the direction of the arrow 42, the eccentric rotates and displaces also the frame in the direction 43 (or in a reverse direction), so permitting to obtain the desired result.

The teeth, in accordance with this invention, can also be cut on ordinary machines, with a cutter having a suitable profile. The movement of this cutter along generating lines of the cone to be provided with teeth is then accompanied only by a simple rotation of the blank, instead of the usual complex displacements.

It is to be mentioned that all means for cutting bevel wheels in such a manner that the profile of the teeth, at various points, is constituted by superposable arcs of involute, with variable pressure angles can be employed; in particular, use can be made of milling cutters which instead of having only 4 or 5 teeth and a smooth portion, have one or two turns of teeth, among which four or five have a normal thickness and execute the finishing of the profile; the others on either side of the first ones, become thinner and thinner and serve to dig up the blank. In general, the method of cutting can be of any type.

What I claim as my invention and desire to secure by Letters Patent is:—

A bevel gear wheel, wherein the addendum cone and the dedendum cone have the same vertex and wherein the teeth are straight and symmetrical and have a section in the form of an involute, which remains the same the entire length of the tooth, so that the pressure angle varies from one end of the tooth to the other.

In testimony whereof I have signed my name to this specification.

GEORGES VEBER.